United States Patent
Myrick et al.

(10) Patent No.: US 8,283,633 B2
(45) Date of Patent: Oct. 9, 2012

(54) **TUNING D\* WITH MODIFIED THERMAL DETECTORS**

(75) Inventors: Michael L. Myrick, Irmo, SC (US); Michael N. Simcock, Columbia, SC (US)

(73) Assignee: Halliburton Energy Services, Inc., Houston, TX (US)

( * ) Notice: Subject to any disclaimer, the term of this patent is extended or adjusted under 35 U.S.C. 154(b) by 557 days.

(21) Appl. No.: 12/277,538

(22) Filed: Nov. 25, 2008

(65) Prior Publication Data
US 2009/0140144 A1 Jun. 4, 2009

Related U.S. Application Data

(60) Provisional application No. 61/005,066, filed on Nov. 30, 2007.

(51) Int. Cl.
*G01J 5/00* (2006.01)

(52) U.S. Cl. .................................................. 250/338.1

(58) Field of Classification Search ............... 250/338.1, 250/339.04, 339.07; 438/584
See application file for complete search history.

(56) References Cited

U.S. PATENT DOCUMENTS

| | | | |
|---|---|---|---|
| 3,717,078 A | 2/1973 | Ogura | |
| 3,761,724 A | 9/1973 | Dennis | |
| 4,499,378 A | 2/1985 | Miyatake et al. | |
| 4,595,832 A * | 6/1986 | LaDelfe et al. | 250/338.3 |
| 4,607,914 A | 8/1986 | Fienup | |
| 4,687,337 A | 8/1987 | Stewart et al. | |
| 4,704,536 A | 11/1987 | Sugiyama et al. | |
| 4,891,574 A | 1/1990 | Nagaya et al. | |
| 4,981,332 A | 1/1991 | Smith | |
| 5,071,526 A | 12/1991 | Pletcher et al. | |
| 5,090,807 A | 2/1992 | Tai | |
| 5,103,340 A | 4/1992 | Dono et al. | |
| 5,137,364 A | 8/1992 | McCarthy | |
| 5,150,236 A | 9/1992 | Patel | |
| 5,223,715 A | 6/1993 | Taylor | |
| 5,259,381 A | 11/1993 | Cheung et al. | |
| 5,406,082 A | 4/1995 | Pearson et al. | |
| 5,504,332 A | 4/1996 | Richmond et al. | |
| 5,622,868 A | 4/1997 | Clarke et al. | |

(Continued)

FOREIGN PATENT DOCUMENTS

EP 1969326 A1 9/2008

(Continued)

OTHER PUBLICATIONS

Simcock et al., Tuning D\* with Modified Thermal Detectors, Applied Spectroscopy, vol. 60, No. 12, pp. 1469-1476 (published Nov. 12, 2006).*

(Continued)

*Primary Examiner* — David Porta
*Assistant Examiner* — Yara Green
(74) *Attorney, Agent, or Firm* — Haynes and Boone, LLP

(57) ABSTRACT

Disclosed is apparatus and methodology for producing thermal detectors with spectral responsivities that mimic the absorptions of chemical analytes, and whose detector characteristics approach those of conventional broad-band thermal detectors. In an exemplary arrangement, the methodology provides for modification of a known Si-based thermal detector by adding a near-infrared dye absorbing film above a reflector deposited directly on the thermal detector element. The method is general to all types of thermal detectors that can be divided into separate absorber and thermal sensor components.

36 Claims, 7 Drawing Sheets

U.S. PATENT DOCUMENTS

| | | | |
|---|---|---|---|
| 5,641,962 A | 6/1997 | Perry et al. |
| 5,710,655 A | 1/1998 | Rumbaugh et al. |
| 5,734,098 A | 3/1998 | Kraus et al. |
| 5,737,076 A | 4/1998 | Glaus et al. |
| 5,760,399 A | 6/1998 | Trygstad |
| 5,781,289 A | 7/1998 | Sabsabi et al. |
| 5,799,231 A | 8/1998 | Gates et al. |
| 5,831,742 A | 11/1998 | Watson et al. |
| 5,905,571 A | 5/1999 | Butler et al. |
| 5,939,717 A | 8/1999 | Mullins |
| 5,941,821 A | 8/1999 | Chou |
| 5,945,676 A | 8/1999 | Khalil et al. |
| 5,946,088 A | 8/1999 | Aldridge |
| 5,946,089 A | 8/1999 | Duer |
| 5,991,048 A | 11/1999 | Karlson et al. |
| 6,006,585 A | 12/1999 | Forster |
| 6,040,914 A | 3/2000 | Bortz et al. |
| 6,124,937 A | 9/2000 | Mittenzwey et al. |
| 6,137,108 A | 10/2000 | DeThomas et al. |
| 6,176,323 B1 | 1/2001 | Weirich et al. |
| 6,198,531 B1 | 3/2001 | Myrick et al. |
| 6,304,854 B1 | 10/2001 | Harris |
| 6,317,648 B1 | 11/2001 | Sleep et al. |
| 6,347,131 B1 | 2/2002 | Gusterson |
| 6,350,389 B1 | 2/2002 | Fujishima et al. |
| 6,420,708 B2 | 7/2002 | Wilks, Jr. et al. |
| 6,430,513 B1 | 8/2002 | Wang et al. |
| 6,469,785 B1 | 10/2002 | Duveneck et al. |
| 6,476,384 B1 | 11/2002 | Mullins et al. |
| 6,490,035 B1 | 12/2002 | Folestad et al. |
| 6,517,230 B1 | 2/2003 | Afnan et al. |
| 6,522,945 B2 | 2/2003 | Sleep et al. |
| 6,529,276 B1 | 3/2003 | Myrick |
| 6,573,999 B1 | 6/2003 | Yang |
| 6,600,560 B2 | 7/2003 | Mikkelsen et al. |
| 6,630,663 B2 | 10/2003 | Murphy et al. |
| 6,667,802 B2 | 12/2003 | Faus et al. |
| 6,690,464 B1 | 2/2004 | Lewis et al. |
| 6,697,195 B2 | 2/2004 | Weber et al. |
| 6,707,043 B2 | 3/2004 | Coates et al. |
| 6,711,503 B2 | 3/2004 | Haaland |
| 6,737,654 B2 | 5/2004 | Ducourant |
| 6,741,335 B2 | 5/2004 | Kinrot et al. |
| 6,748,334 B1 | 6/2004 | Perez et al. |
| 6,765,212 B2 | 7/2004 | Goetz et al. |
| 6,771,369 B2 | 8/2004 | Rzasa et al. |
| 6,776,517 B2 | 8/2004 | Afnan et al. |
| 6,798,518 B2 | 9/2004 | DiFoggio et al. |
| 6,870,629 B1 | 3/2005 | Vogel et al. |
| 6,952,267 B2 | 10/2005 | Rarac |
| 6,980,285 B1 | 12/2005 | Hansen |
| 6,982,431 B2 | 1/2006 | Modlin et al. |
| 6,995,840 B2 | 2/2006 | Hagler |
| 7,006,214 B2 | 2/2006 | Rzasa et al. |
| 7,123,844 B2 | 10/2006 | Myrick |
| 7,138,156 B1 | 11/2006 | Myrick et al. |
| 7,145,145 B2 | 12/2006 | Benson |
| 7,245,374 B2 | 7/2007 | Hendriks |
| 7,271,883 B2 | 9/2007 | Newell et al. |
| 7,399,968 B2 | 7/2008 | Lewis et al. |
| 7,405,825 B2 | 7/2008 | Schuurmans et al. |
| 7,411,729 B2 | 8/2008 | Lyama et al. |
| 7,623,233 B2 | 11/2009 | Freese et al. |
| 7,652,767 B2 | 1/2010 | Harsh et al. |
| 7,697,141 B2 | 4/2010 | Jones et al. |
| 7,853,104 B2 | 12/2010 | Oota et al. |
| 7,889,346 B2 | 2/2011 | Myrick et al. |
| 7,911,605 B2 * | 3/2011 | Myrick et al. ............... 356/303 |
| 7,920,258 B2 | 4/2011 | Myrick et al. |
| 2002/0008215 A1 | 1/2002 | Evans |
| 2002/0050567 A1 | 5/2002 | Boudet et al. |
| 2002/0071118 A1 | 6/2002 | Shinbori et al. |
| 2002/0108892 A1 | 8/2002 | Goetz et al. |
| 2002/0109094 A1 | 8/2002 | Goetz et al. |
| 2002/0154315 A1 | 10/2002 | Myrick |
| 2003/0056581 A1 | 3/2003 | Turner et al. |
| 2003/0059820 A1 | 3/2003 | Vo-Dinh |
| 2003/0071988 A1 | 4/2003 | Smith et al. |
| 2003/0094495 A1 | 5/2003 | Knowles et al. |
| 2003/0111606 A1 | 6/2003 | Berghmans et al. |
| 2003/0117628 A1 | 6/2003 | Harju et al. |
| 2003/0202179 A1 | 10/2003 | Larsen et al. |
| 2004/0012782 A1 | 1/2004 | Mason et al. |
| 2004/0106098 A1 | 6/2004 | Chen et al. |
| 2004/0160601 A1 | 8/2004 | Womble et al. |
| 2004/0197850 A1 * | 10/2004 | Baer et al. ................... 435/40 |
| 2004/0227086 A1 | 11/2004 | Haug et al. |
| 2005/0032235 A1 | 2/2005 | Tummala et al. |
| 2005/0077476 A1 | 4/2005 | Poteet et al. |
| 2005/0087132 A1 | 4/2005 | Dickey et al. |
| 2005/0167264 A1 | 8/2005 | Sternbergh et al. |
| 2005/0251289 A1 | 11/2005 | Bonney et al. |
| 2005/0264815 A1 | 12/2005 | Wechsler et al. |
| 2005/0288906 A1 | 12/2005 | Drennen, III et al. |
| 2006/0035018 A1 * | 2/2006 | Sakurai et al. ............... 427/162 |
| 2006/0051036 A1 | 3/2006 | Treado et al. |
| 2006/0093523 A1 | 5/2006 | Norman |
| 2006/0142955 A1 | 6/2006 | Jones et al. |
| 2006/0153492 A1 | 7/2006 | Treves et al. |
| 2006/0158734 A1 | 7/2006 | Schuurmans et al. |
| 2006/0169902 A1 * | 8/2006 | Watanabe ................... 250/338.1 |
| 2006/0197015 A1 | 9/2006 | Sterling et al. |
| 2006/0276697 A1 | 12/2006 | Demuth et al. |
| 2007/0035737 A1 | 2/2007 | Andrews et al. |
| 2007/0137292 A1 | 6/2007 | Xian et al. |
| 2007/0201136 A1 | 8/2007 | Myrick |
| 2007/0282647 A1 | 12/2007 | Freese et al. |
| 2007/0294004 A1 | 12/2007 | Alessandrini et al. |
| 2008/0111064 A1 | 5/2008 | Andrews et al. |
| 2008/0231849 A1 | 9/2008 | Myrick |
| 2008/0276687 A1 | 11/2008 | Myrick et al. |
| 2008/0309930 A1 | 12/2008 | Rensen |
| 2009/0002697 A1 | 1/2009 | Freese et al. |
| 2009/0015819 A1 | 1/2009 | Van Beek et al. |
| 2009/0033933 A1 | 2/2009 | Myrick et al. |
| 2009/0073433 A1 | 3/2009 | Myrick et al. |
| 2009/0097024 A1 | 4/2009 | Blackburn et al. |
| 2009/0140144 A1 | 6/2009 | Myrick et al. |
| 2009/0216504 A1 | 8/2009 | Priore et al. |
| 2009/0219538 A1 | 9/2009 | Myrick et al. |
| 2009/0219539 A1 | 9/2009 | Myrick et al. |
| 2009/0250613 A1 | 10/2009 | Myrick et al. |
| 2009/0299946 A1 | 12/2009 | Myrick et al. |
| 2009/0316150 A1 | 12/2009 | Myrick et al. |
| 2010/0042348 A1 | 2/2010 | Bakker |
| 2010/0073666 A1 | 3/2010 | Perkins et al. |
| 2010/0141952 A1 | 6/2010 | Myrick et al. |
| 2010/0149537 A1 | 6/2010 | Myrick et al. |
| 2010/0153048 A1 | 6/2010 | Myrick et al. |
| 2010/0195105 A1 | 8/2010 | Myrick et al. |
| 2010/0211329 A1 | 8/2010 | Farquharson et al. |
| 2010/0245096 A1 | 9/2010 | Jones et al. |
| 2010/0265509 A1 | 10/2010 | Jones et al. |
| 2010/0302539 A1 | 12/2010 | Myrick et al. |
| 2010/0305741 A1 | 12/2010 | Myrick |
| 2010/0328669 A1 | 12/2010 | Myrick et al. |

FOREIGN PATENT DOCUMENTS

| | | | |
|---|---|---|---|
| EP | 1974201 A1 | 10/2008 |
| EP | 2087328 A2 | 8/2009 |
| EP | 2140238 A1 | 1/2010 |
| JP | 57142546 A | 9/1982 |
| WO | 2004/057284 A1 | 7/2004 |
| WO | 2005/062006 A1 | 7/2005 |
| WO | 2005/062986 A1 | 7/2005 |
| WO | 2006/031733 A2 | 3/2006 |
| WO | 2006/064446 A1 | 6/2006 |
| WO | 2006/137902 A2 | 12/2006 |
| WO | 2007/061435 A1 | 5/2007 |
| WO | 2007/061436 A1 | 5/2007 |
| WO | 2007/061437 A1 | 5/2007 |
| WO | 2007/062202 A1 | 5/2007 |
| WO | 2007/062224 A1 | 5/2007 |
| WO | 2007/064578 A2 | 6/2007 |
| WO | 2008/002903 A2 | 1/2008 |

| | | |
|---|---|---|
| WO | 2008/057912 A2 | 5/2008 |
| WO | 2008/057913 A2 | 5/2008 |
| WO | 2008/121684 A1 | 10/2008 |

OTHER PUBLICATIONS

Mandelis et al., "Theory of Photopyroelectric Spectroscopy of Solids", Journal of Applied Physics, vol. 57, p. 4421, 1985.
P.G. Miney et al., "A New Optically Reflective Thin Layer Electrode (ORTLE) Window: Gold on a Thin Porous Alumina Film Used to Observe the Onset of Water Reduction", Electroanalysis, 16, No. 1-2, pp. 113-119, 2004.
Mullins et al., "Gas-Oil Ratio of Live Crude Oils Determined by Near-Infrared Spectroscopy", Applied Spectroscopy, vol. 55, No. 2, pp. 197-201, 2001.
M.L. Myrick et al., "Application of Multivariate Optical Computing to Near-Infrared Imaging", Vibration Spectroscopy-based Sensor System, Proceedings of SPIE, vol. 4577, pp. 148-157, 2002.
E.B. Martin et al., "Process Performance Monitoring Using Multivariate Statistical Process Control", IEE Proc.—Control Theory Appl., vol. 143, No. 2, Mar. 1996.
Mandelis et al., "Theory of Photopyroelectric Spectroscopy of Solids", Journal of Applied Physics, vol. 57, No. 9, p. 4421-4430, 1985.
Zagonel et al., "Multivariate Monitoring of Soybean Oil Ethanolysis by FTIR", Talanta, vol. 63, No. 4, pp. 1021-1025, 2004.
Inon et al., "Combination of Mid- and Near-Infrared Spectroscopy for the Determination of the Quality Properties of Beers", Analytica Chimica Acta, vol. 571, No. 2, pp. 167-174, 2006.
Czarnik-Matusewicz et al., "Temperature-Dependent Water Structural Transitions Examined by Near-IR and Mid-IR Spectra Analyzed by Multivariate Curve Resolution and Two-Dimensional Correlation Spectroscopy", Analytica Chimica Acta, vol. 544, No. 1-2, pp. 15-25, 2005.
Pimentel et al., "Determination of Biodiesel Content when Blended with Mineral Diesel Fuel Using Infrared Spectroscopy and Multivariate Calibration", Microchemical Journal, vol. 82, No. 2, pp. 201-206, 2006.
Ghesti et al., "Application of Raman Spectroscopy to Monitor and Quantify Ethyl Esters in Soybean Oil Transesterification", Journal of the American Oil Chemists' Society, vol. 83, pp. 597-601, 2006.
Dereniak et al., Infrared Detectors and Systems, John Wiley & Sons: New York, Chapter 9, pp. 395-438, 1996.
Prystay et al., "Thermophysical Measurements and Interfacial Adhesion Studies in Ultrathin Polymer Films Using Homodyne Photothermal Spectrometry", Applied Spectroscopy, vol. 47, No. 4, pp. 501-514, 1993.
Simcock et al, "Tuning D* with Modified Thermal Detectors", Applied Spectroscopy, vol. 60, No. 12, pp. 1469-1476, 2006.
Lang, "Ferroelectrlc Polymers and Ceramic-Polymer Composites", Key Engineering Materials, vol. 92-93, pp. 83-142, 1994.
Profeta et al., "Spectral Resolution in Multivariate Optical Computing", Spectrochimica Acta Part A: Molecular and Biomolecular Spectroscopy, vol. 67, pp. 483-502, 2007.
Power et al., "Rapid Recovery of Wide Bandwidth Photothermal Signals via Homodyne Photothermal Spectrometry: Theory and Methodology", Applied Spectroscopy, vol. 47, No. 4, pp. 489-500, 1993.
Workman, Handbook of Organic Compounds: NIR, IR, Raman and UV-Vis Spectra Featuring Polymers and Surfactants (a 3-volume set); Academic Press: San Diego, vol. 3, pp. 96-160, 2001.
Knothe, "Analyzing Biodiesel: Standards and Other Methods", Journal of the American Oil Chemists Society, vol. 83, No. 10, pp, 823-833, 2006.
E.D. Palik, Handbook of Optical Constants of Solids I, Academic Press, San Diego, pp. 350-357, 1998.
M.L. Myrick, "Multivariate optical elements simplify spectroscopy", Laser Focus World 38, 91-94, 2002.
O. Soyemi et al., "Design and testing of a multivariate optical element: The first demonstration of multivariate optical computing for predictive spectroscopy", Anal. Chem. 73, No. 6, pp. 1069-1079, (2001).
M.L. Myrick et al., "A single-element all-optical approach to chemometric prediction", Vib. Spectrosc. 28, 73-81, 2002.
A.M.C. Prakash et al., "Optical regression: a method for improving quantitative precision of multivariate prediction with single channel spectrometers", Chemom. Intell. Lab. Syst. 46, 265-274, 1999.
R.A. Deverse et al., "Realization of the Hadamard multiplex advantage using a programmable optical mask in a dispersive flat-field near-infrared spectrometer", Appl. Spectrosc. 54, 1751-1758, 2000.
F.G. Haibach et al., "Precision in multivariate optical computing", Appl. Optics 43, 2130-2140, 2004.
M.L. Myrick et al., "Application of multivariate optical computing to simple near-infrared point measurements", Proceedings of the SPIE, Bellingham, VA, US, vol. 4574, pp. 208-215, 2002.
O.S. Heavens, Optical Properties of Thin Solid Films, Dover Publications, Inc., Mineola, USA, pp. 62-81, 242-249, 1991.
S. Betancourt et al., "Analyzing Hydrocarbons in the Borehole", Oilfield Review, pp. 54-61, Autumn 2003.
D. Eastwood at al., "Field applications of stand-off sensing using visible/NIR multivariate optical computing", Ground and Air Pollution Monitoring and Remediation, SPIE vol. 4199, pp. 105-114, 2001.
Haibach at el., "On-line Reoptimization of Filter Designs for Multivariate Optical Elements", Applied Optics, vol. 42, No. 10, pp. 1833-1838, Apr. 1, 2003.
Mullins et al., "Gas-Oil Ratio of Live Crude Oils Determined by Near-Infrared Spectroscopy", Optical Methods for Industrial Processes, Proceedings of SPIE vol. 4201, pp. 73-81, 2001.
M.P. Nelson et al., "Multivariate optical computation for predictive spectroscopy", SPIE Vo. 3261, pp. 232-243, 1998.
O. Soyemi et al., "A Simple Optical Computing Device for Chemical Analysis", Proceedings of SPIE Vo. 4284, pp. 17-28, 2001.
O. Soyemi at al., "Design of angle tolerant multiveriate optical elements for chemical imaging", Applied Optics, vol. 41, No. 10, pp. 1936-1941, Apr. 1, 2002.
O. Soyemi et al., "Nonlinear Optimization Algorithm for Multivariate Optical Element Design", Applied Spectroscopy, vol. 56, No. 4, pp. 477-487, 2002.
O. Soyemi et al., "Novel Fitter Design Algorithm for Multivariate Optical Computing", Advanced Environmental and Chemical Sensing Technology, Proceedings of SPIE Vo. 4205, pp. 288-299, 2001.
Strausz et al., "About the Colloidal Nature of Asphaltenes and the MW of Covalent Monomeric Units", American Chemical Society, Energy and Fuels 16, No. 4, 2002 (abstract).
N. Aske et al., "Determination of Saturate, Aromatic, Resin, and Asphitenic (SARA) Components in Crude Oils by Means of Infrared and Near-Infrared Spectroscopy", American Chemical Society, Energy and Fuels 15, No. 5, pp. 1304-1312, 2001.
N. Aske et al., "Asphaltene Aggregation from Crude Oils and Models Systems Studied by High-Pressure NIR Spectroscopy", Energy and Fuels, American Chemical Society, 16, No. 5, pp. 1287-1295, 2002.
Sastry et al., "Determination of Physiocochemical Properties and Carbon-Type Analysis of Base Oils Using Mid-IR Spectroscopy and Partial Least Squares Regression Analysis", American Chemical Society, Energy and Fuels 12, No. 2, pp. 304-311, 1998.
Y. Yan et al. "Fluorescence Fingerprint of Waters: Excitation-Emission Matrix Spectroscopy as a Tracking Toot", Applied Spectroscopy, vol. 54, No. 10, 2000.
M.P. Nelson et al., "Multivariate optical computation for predictive spectroscopy", Analytical Chemistry, vol. 70, No. 1, pp. 73-82, Jan. 1, 1998.
M.P. Nelson et al., "Fabrication and evaluation of a dimension-reduction fiberoptic system for chemical imaging applications", Review of Scientific Instruments, vol. 70, No. 6, Jun. 1999.
M.L. Myrick, "New approaches to implementing predictive spectroscopy", Proceedings of the SPIE Conference on Pattern Recognition. Chemometrics, and Imaging for Optical Environmental Monitoring, SPIE vol. 3854, Sep. 1999.
M. Groner et al., "Identification of Major Water-Soluble Fluorescent Components of Some Petrochemicals", Marine Pollution Bulletin, vol. 42, No. 10, pp. 935-941, 2001.
M.V. Schiza et al., "Use of a 2D to 1D Dimension Reduction Fiber-Optic Array for Multiwavelength Imaging Sensors", Applied Spectroscopy, vol. 55, No. 2, 2001.
M.L. Myrick et al., "Spectral tolerance determination for multivariate optical element design", Fresenius J Anal Chem, 369:351-355, 2001.
R.J. Priore et al., "Miniature Stereo Spectral Imaging System for Multivariate Optical Computing", Applied Spectroscopy, vol. 58, No. 7, 2004.
M.L. Myrick et al., "Use of Molecular Symmetry to Describe Paull Principle Effects on the Vibration-Rotation Rotation Spectroscopy of $CO_2(g)$", Journal of Chemical Education, vol. 81, No. 3, Mar. 2004.
M.N. Simcock et al., "Precision in Imaging multivariate optical computing", Applied Optics, vol. 46., No. 7, Mar. 1, 2007.
Ozturk et al., "Filtering Characteristics of Hybrid Integrated Polymer and Compound Semiconductor Waveguides", In: Journal of Lightwave Technology, vol. 20, No. 8, Aug. 2002.

* cited by examiner

TUNING D* WITH MODIFIED THERMAL DETECTORS

This application claims priority under 35 USC 119(e) of Provisional Patent Application Ser. No. 61/005,066 filed Nov. 30, 2007, entitled "Tuning D* with Modified Thermal Detectors," which is hereby incorporated by reference in its entirety.

FIELD OF THE INVENTION

The present subject matter relates to thermal/optical measurement. More specifically, the present subject matter relates to methodologies for adjusting the response characteristics of a thermal detector.

BACKGROUND OF THE INVENTION

For some time research has been conducted on a chemometrics-based optical measurement method called multivariate optical computing (MOC). A phenomenon in MOC has been identified and designated as the MOC passband disadvantage that has been defined as the cost of including large spectral windows in which the sample shows no absorbance. The phenomenon is analogous to the multiplex disadvantage sometimes observed in FT-Raman spectroscopy of weak bands in the presence of stronger features. The passband disadvantage increases noise in a measurement without improving, and sometimes harming, the ability to chemometrically model a chemical system.

The MOC passband disadvantage, like the FT Raman multiplex disadvantage, is addressed by restricting the spectral band of a measuring device to wavelengths of greatest interest using a physical optics means like filtering or by using special light sources, etc. However, many of the best and most convenient methods for physical wavelength selection have undesirable consequences such as irreproducibility. Interference filters, for instance, vary from production lot to production lot, and can even vary within a single lot. For this reason, the physical properties of bulk materials have generally been relied on to provide the most stable wavelength selection. This same phenomenon affects the reproducibility of simple bandpass photometers, where the filtering elements vary from instrument to instrument, making calibrations instrument-dependent.

A more nearly ideal selection of wavelengths would be made by using detectors whose wavelength response is tuned more directly and reproducibly toward the spectral intensity of the analyte whose measurement is sought. If such a detector could be created and if it were convenient to use, then its responses would better correlate with analyte concentration in mixtures than would those of a broadband detector, even in the absence of any additional treatment. This would improve the consistency of photometers and, if used in a MOC system, one might expect such a detector to provide enhanced performance and reduced sensitivity to spectral interferences.

A direct approach to creating a simple detector with a spectral response tuned or adjusted to the absorption bands of an analyte is to base it on thermal detection methods. Photothermal and photoacoustic methods provide signals proportional to energy loss following absorption by detecting the conversion of light into heat by non-radiative decay. A detector in which the pure analyte or mixture of analytes is used as the detection medium in a photothermal or photoacoustic measurement can serve to restrict the wavelength band. The same concept has been previously demonstrated using Golay cells.

Solid-state detectors based on the detection of evolved heat are more commonly used in optical systems. Pyroelectric detectors, thermocouple or thermopile detectors, bolometers, etc. are all relatively sensitive, broadband detectors based on the detection of heat or temperature. In each case, the detection of light over a wide range of wavelengths is accomplished by converting it to heat and measuring a temperature-dependent detector property. Compared to photon detectors, thermal detectors usually have lower detectivities (D*), but a wider and more featureless spectral response. For a photodector, detectivity, D*, is generally defined as a figure of merit used to characterize performance, and is equal to the reciprocal of noise equivalent power (NEP), normalized to unit area and unit bandwidth.

While various implementations of temperature-dependent detectors have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for adjusting or tuning the spectral detectivity, D*, of a thermal detector through the absorbance of a polymer film has been developed.

An approach to combining the chemical specificity of photoacoustic or photothermal methods with the convenience of a common thermal-type solid-state detector is to modify an existing solid-state thermal detector. Modification requires at least the reduction of the broadband response of the detector by coating with a mirror film or films, followed by coating with the desired absorber.

In accordance with aspects of certain embodiments of the present subject matter, methodologies are provided for modifying an existing thermal detector to include a metal mirror and a polymer film in a configuration such that the polymer film's absorbance is responsible for most of the detector's thermal conversion.

In accordance with further aspects of the present subject matter the detector is designed to tailor the spectral response of optical systems more specifically to analytes in order to improve precision in methods such as multivariate optical computing (MOC) and simple photometry.

In accordance with other embodiments of the present subject matter, interference effects in the thin film response are eliminated by the textured surface of the silicon thermopile, which makes the spectral response relatively simple. In an exemplary configuration, the maximum detectivity when employing a 1-micron-thick film was found to be 20% of the detectivity of the original wide-band detector at 10 Hz modulation frequency. The thermal diffusion length for an exemplary polymer at 10 Hz is estimated to be 40 micrometers. The detectivity of the modified detector may be approximated as the product of the D* of the underlying thermal detector and the absorbance of the modifying film, provided the modulation frequency is low and interference effects are compensated.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
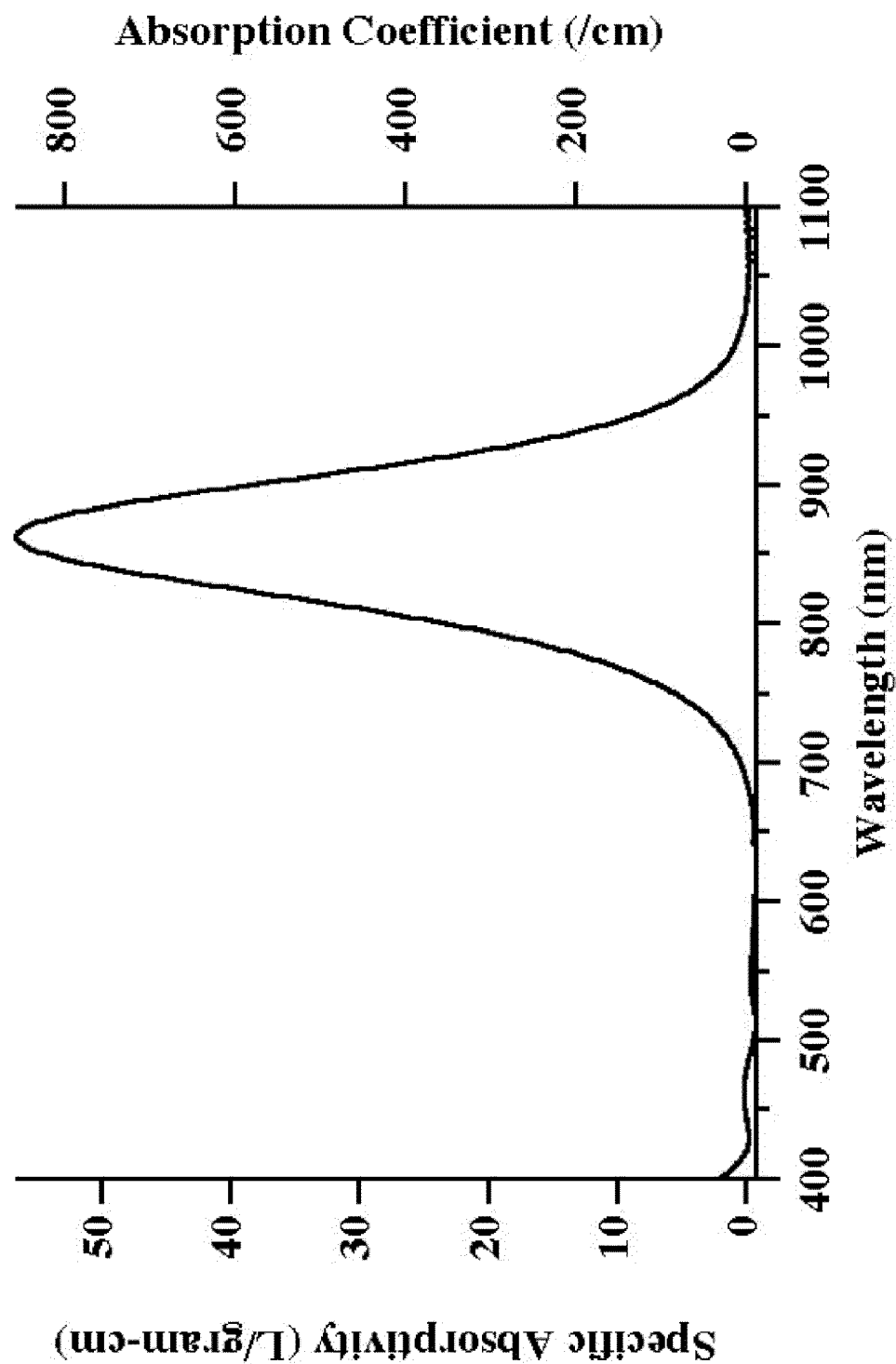
FIG. 1 illustrates absorbance of a near infrared dye such as Epolight™ 4019 in units of L/g-cm.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with an improved methodology for fabrication and characterization of a modified thermopile detector having a spectral detectivity, $D^*$, primarily determined by the absorbance of a polymer film.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

It should be understood by those of ordinary skill in the art that the present discussion is a description of exemplary embodiments only, and is not intended as limiting the broader aspects of the present invention.

Prior reports of modified detectors focus on signals that are "small." In contrast, a photodetector is only valuable if it possesses an adequate detectivity ($D^*$) to enable an optical measurement. A "good" detector is one that has a maximum response per watt or photon of light with the smallest possible noise per unit area. However, to date no one has demonstrated a high efficiency modified solid-state thermal detector, nor has an effort been made to quantify the detectivity of a modified solid-state detector. In principal, the $D^*$ of a modified detector should approach that of the detector prior to modification, yet this has also not been demonstrated. These types of comparisons between modified and unmodified detectors are generally referred to herein as "characterizations."

In accordance with the present subject matter, a conventional thermopile detector with a dye-doped polymer film is modified, where the dye absorbs light in the 860 nm spectral region. After modification, a radiometric calibration of the detector is performed to compare its spectral performance following the film coating to that of the original broadband detector. Analysis of results shows that detectors tailored to improve the detection of a chemical analyte or chemical factor can be produced by this method, and that their detectivity is determined by the absorbance of the coating in a way that is predictable by thin-film calculations and controllable.

The performance of the modified detector can be defined by the product of the detector $D^*$ with the absorbance of the film, provided the film is not thermally thick and that interference effects are mitigated. For moderate thicknesses of films and moderate detection rates, chemically tailored detectors for visible MIR and NIR applications are feasible. Although one embodiment of the present subject matter presented here uses a thermopile detector, the method is general to most if not all thermal detectors, including pyroelectric detectors. Thermopiles have values of $D^*$ that generally range between $$1.5 - 9 \times 10^8 \frac{cm - \sqrt{Hz}}{W}$$

and response speeds of about 4-30 msec. Pyroelectric detectors have similar or somewhat higher possible values of $D^*$, but sub-microsecond response times.

The following experiment is provided as a non-limiting exemplary illustration of the present subject matter. An ST150 Si-based thermopile detector was used with its hermitic can removed. The first step in the detector modification was to coat the surface of the detector element with a SiO2 film to act as an electrically insulating layer so that a subsequent silver layer would not short the device. The silica layer was deposited onto the thermopile using a magnetron sputtering system. The device was fixed to a holder and the device connections and base were grounded. A wire mesh was placed over the detector to act as a Faraday cage to eliminate any arcing that might occur and result in damage to the detector circuitry. Power, gas and time settings were used which, without the Faraday cage, would normally deposit ~2000 nm of $SiO_2$ onto a substrate. It appears that >1000 nm of $SiO_2$ was actually deposited through the mesh. Metallic Ag was then deposited by magnetron sputtering using a CrC-100 sputtering system. The Ag film was of sufficient thickness so that at a wavelength of 400 nm the transmission through the film was below 0.0001 as determined by test depositions on BK7 glass slides. To complete the detector modification, a drop of a dye containing polymer solution, described below, was dripped across the face of the Ag covered detector after it had been preheated to about 50° C. and allowed to dry.

At each step the detector was mounted in a metal holder which had a BK7 glass window and was then radiometrically characterized at room temperature using a radiometric characterization system consisting of a model OL 750-S monochromator with a OL 750C controller, and a model OL-740-20D light source using the tungsten lamp mode. The intensity at the exit slit was evaluated using a model OL 750-HS-301 EC Silicon detector and model OL 750-HSD-380 pyroelectric detector, using a crossover wavelength of 1050 nm. Both detectors had been calibrated by the manufacturer with NIST traceable standards. The detector characterization was done using a model DSM 1A support module with a model OL 750-610 adapter, which was connected through the controller module. Measurements of the detector were done in the AC mode using a chopping frequency of about 10 Hz, with a settling time of about 2 seconds and an integration time of about 3 seconds. The spectral resolution was 10 nm up to about 2050 nm and about 40 nm above. Measurements with narrower slits were performed and showed, within the limits of the noise of our measurement, the same results for spectral responsivity. The data reported is based solely on the lower resolution scans because of the improved S/N of the measurement compared to the higher resolution scans.

Following this the detector response as a function of chopping frequency was investigated. This was done using a SDL 8530 diode laser which had an output beam at 785 nm, an optical chopper, a low noise pre-amp with the detector hooked up to the 100 MW input using high pass DC, and AC coupling. The signal was measured using an oscilloscope using a lock-in measurement mode.

The measured D* of the ST150 detectors used in this study were approximately a factor of 5 lower than reported by the manufacturer, partly due to the higher resistance of the detectors tested which increased the noise calculation and partly due to a lower measured responsivity. For purposes of this illustration, the response of the modified detector relative to the unmodified detector on which it is based is the factor of interest.

The polymer solution was prepared by mixing 0.0696 g of a near infrared dye such as Epolight™ 4019 in 100 ml of methylene chloride. Epolight™ 4019 is a near infrared dye available from Epolin, Inc. of Newark, N.J. 11.0 g of acrylic ester resin was dissolved in the same mixture to serve as a binding material that was transparent between 400 nm and 1100 nm.

FIG. 1 shows the specific absorptivity of a near infrared dye such as Epolight™ 4019 in the region between 400 nm and 1100 nm These data are derived from measurement of a solution of 19.48 mg/L of a near infrared dye such as Epolight™ 4019 in methylene chloride. λmax is measured to be 862 nm (specific absorbance=56.6 L/gram-cm) in methylene chloride and 860 nm in the resin.)

The same specific absorbance can be attributed to a near infrared dye such as Epolight™ 4019 in the polymer solution at 860 nm. Based on the specific absorbance of Epolight™ 4019 (56.6 L/gram-cm), the density of the polymer (measured by water displacement to be 1.04 g/cm3), and the mass ratio of the polymer to dye in the stock solutions (158 g polymer/g dye), the total thickness of the polymer films can be estimated as 26.8 μm per absorbance unit at 860 nm.

Dip coat testing was performed using glass slides to estimate the achievable thickness of the polymer films as a function of the slide withdrawal rate. For withdrawal rates ≧0.1 cm/sec, the thickness (d) was well fit as a linear function of drawing rate (r) using the formula d(μm)=0.42+2.31r(cm/s), with a relative standard deviation of the slope of 2.2%. Films with thickness between 0.4 and 5 micrometers were studied for this calibration.

Figure 2:
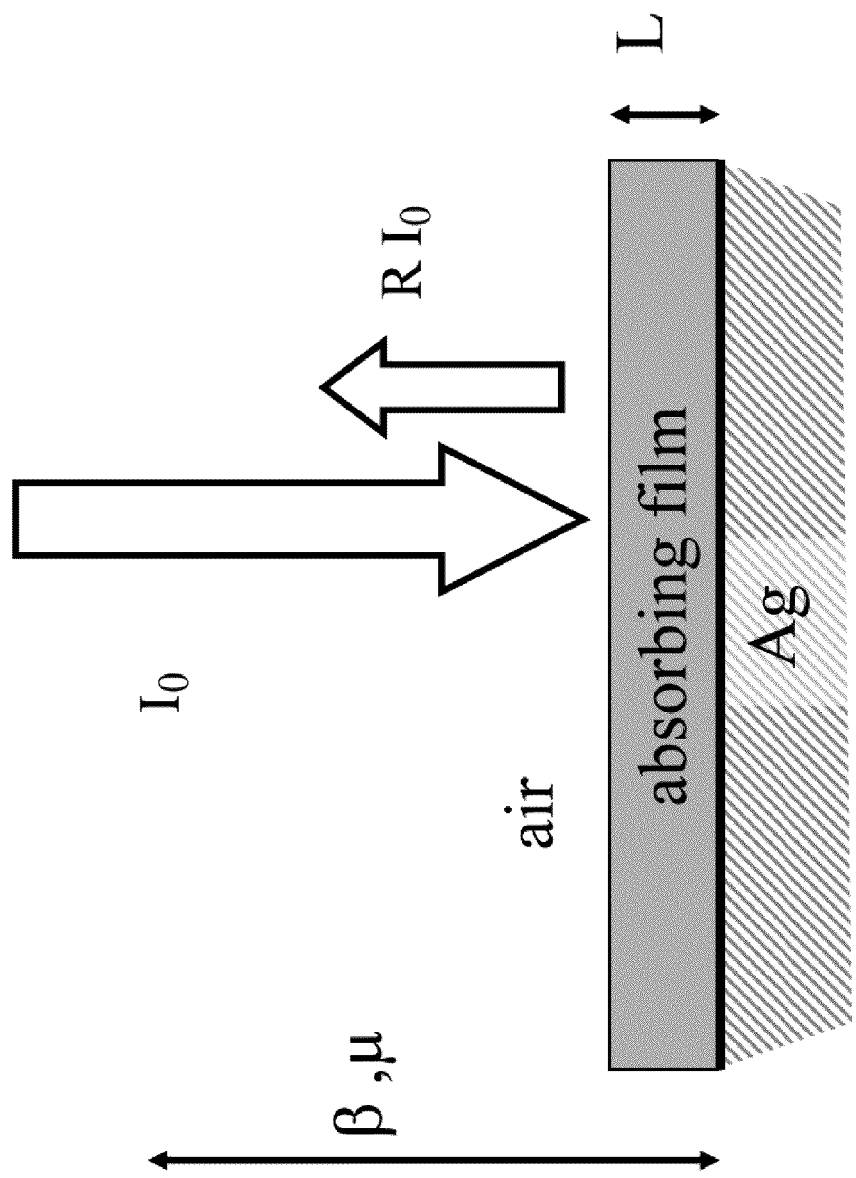
FIG. 2 illustrates a physical model used to estimate spectral responsively.

Calculations of the expected response for a model of the system were performed using the matrix method of Abelés under the assumption that the polymer film is thermally thin. In the case of a thermally thin film, the spectral response is expected to closely follow the spectral energy loss on reflection, (1-R), where R is the vector of spectral reflectance of the system. The physical model of the system is illustrated in FIG. 2.

The quality of detectors having different dimensions, different noise-equivalent bandwidths, modulation frequencies and wavelength responses is most appropriately compared using the parameter of detectivity as a function of wavelength (λ) and modulation frequency (f), D*(λ,f). This spectral detectivity is the reciprocal of the noise equivalent power of a detector, normalized for area and noise equivalent bandwidth. It is numerically equal to the signal-to-noise (S/N) ratio expected of a 1 $cm^2$-active-area detector of the same type when 1 W of light (at wavelength λ, modulated at frequency f) is detected with a bandwidth of 1 Hz (i.e., with a settling time constant of 1 second).

Figure 3:
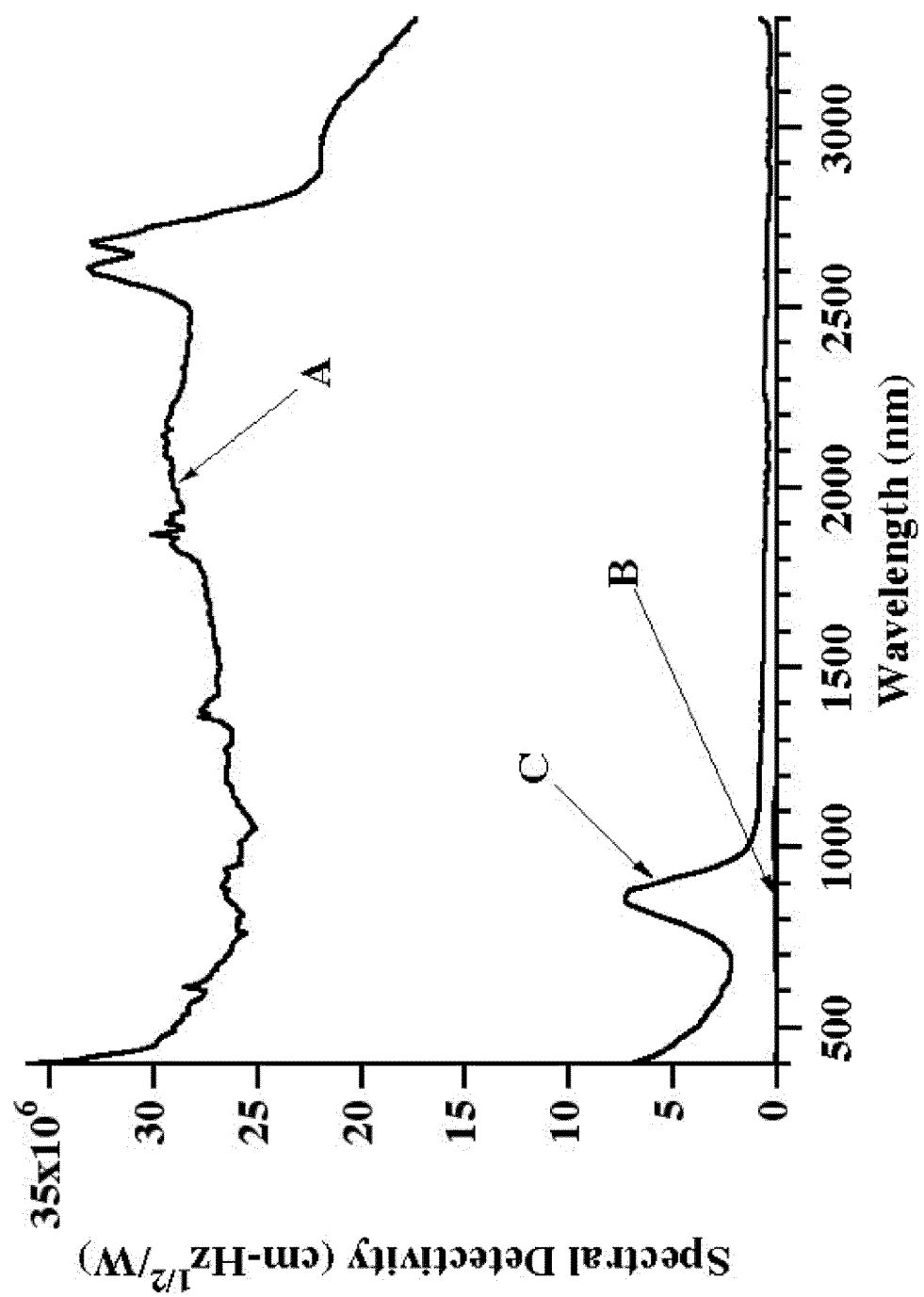
FIG. 3 illustrates detectivity of an ST150 thermopile detector element at 10 Hz modulation rate.

FIG. 3 shows the measured spectral detectivity at 10 Hz modulation frequency of an ST150 thermopile detector as received (curve A), the detector following deposition of a thin $SiO_2$ electrical insulator and silver film (curve B), and following the deposition of the polymer film with 860-nm dye absorption (curve C). The detectivity was determined by measuring the spectral responsivity, calculating the thermal voltage noise at 1 Hz bandwidth as:

$$V_n^2 = 4k_B TR \qquad 1$$

where $k_B$ is Boltzmann's constant, T is the absolute temperature (taken as 298 K) and R is the resistance of the thermopile, measured to be 119.3 kΩ, and using the area of the detector as 2.25 $mm^2$. The spectral responsivity was generally measured to be in the range of 8-11 V/W-nm.

The as-supplied Si-based thermopile has a textured surface that is coated with a proprietary black absorbing film that gives rise to a relatively featureless, broad spectral response for the detector as a whole. The reduction in response near 2700 nm for the unmodified detector is due to absorbance by a BK7 glass window which was part of the housing used to hold the detector during the radiometric measurements; otherwise, the device is reported by the manufacturer to have a response that extends to near 100 micrometers wavelength. Repeated measurements of the response profile for several detectors showed them to be reproducible within our measurement capabilities.

In most cases, deposition of additional films by sputtering caused loss of the black film, although we could not determine whether it delaminated due to heating and was drawn through the vacuum system of the deposition chamber or was etched away in the plasma. Measurements following the deposition of the $SiO_2$ electrical insulator usually showed the response had dropped to nearly zero at all wavelengths except those above the bandgap energy of silicon (i.e., wavelengths shorter than 1200 nm).

Coating of the detector by an optically thick layer of silver (FIG. 3, curve B) reduced the overall response by 2-3 orders of magnitude compared to the unmodified detector because of increased reflectance. Residual transmission by the film resulted in a weak response curve with a shape similar to that of the silicon response. A weak maximum observed near 1000 nm became somewhat stronger over time, which is attributed to gradual oxidation of the silver film resulting in increased transmission. However, this weak signal never became significant (within 2 orders of magnitude) compared to the response from the polymer coat that followed, and as such it did not affect the response curves of the final modified detector.

Coating with a thin layer of doped polymer resulted in the response shown as curve C in FIG. 3. A prominent peak centered at 860 nm appears in the response curve, which corresponds to the absorption maximum of the dye in the polymer film, similar to that observed in methylene chloride solution (FIG. 1). The relative response at the 860 nm peak was >10 times the response at wavelengths where there was no dye or metal absorbance.

The thickness of the film can be approximated by the detectivity observed due to the dye absorbance alone relative to the maximum possible detectivity, a ratio that is equivalent to the fraction of light absorbed by the doped polymer.

To obtain the detectivity due to the dye absorbance, the baseline that is observed to be rising to the blue of the dye maximum is first fitted and removed. This rising baseline is due to absorption in the silver film, which appears in a thin-film model created based on the data in FIG. 3 (vide infra). Intraband transitions in silver have been known to occur in this spectral region for some time. This baseline is well fit by an exponential function over the region 400-1100 nm. Subtracting this baseline from the observed response gives a dye-induced detectivity of $5.98 \times 10^6$ cm$\sqrt{Hz}$/W at 860 nm. This detectivity is a factor of $4.6 \times 10^3$ greater than reported for a modified Golay cell.

The maximum detectivity possible for the detector at 860 nm would be obtained if the absorber were a perfect blackbody. However, the proprietary black coating provided by the manufacturer of the detector is not a perfect absorber. The efficiency of the coating relative to a perfect black absorber is not reported by the manufacturer, so we have assumed the value is 0.90±0.05 at 860 nm, consistent with a number of high-efficiency coatings used for this purpose. The detectivity of the unmodified detector at 860 nm with the black film was measured to be $2.64 \times 10^7$ cm$\sqrt{Hz}$/W, which implies a perfect blackbody detectivity of $2.93 \times 10^7$ cm$\sqrt{Hz}$/W.

The detectivity of the polymer-modified detector is therefore estimated to be 20% of that of a hypothetical perfectly absorbing film. If 80% of the incident light at the peak wavelength is not absorbed by the film, its effective transmission must be 0.80, giving an effective absorbance (as-log T) of 0.097. The estimated proportionality between absorbance and pathlength allows us to then determine the effective pathlength to be 2.6 micrometers. Since the effective pathlength includes two transits of the film (before and after reflection from the Ag film), the film thickness is near 1.3 micrometers. This thickness is in the lower range of thickness created experimentally by dip coating on glass slides. However, this value does not account for resonance effects due to interference, for which modeling using a thin film approach is required.

The observed spectral detectivity of the thermopile with polymer coat (FIG. 3, curve C) shows no interference structure. This could result from the interference structure being too weak to observe, the interference structure being too fine to resolve in our measurement, or from the interference structure being obscured due to variable thickness of the film (e.g., wedging) or roughness of the surface. These questions can be partly resolved by calculating the thin-film reflectance of a model of the system used. For this model, a specular doped polymer film on a polished Ag substrate is used.

The Ag film on this modified detector was made optically thick, so effects from structures underneath (other than via their roughness or texture) are weak. The optical constants of Ag in this model are taken from *Handbook of Optical Constants of solids I*, E. D. Palik, ed. (Academic Press, San Diego, 1998), and film thicknesses between 0.8 and 2.1 micrometers were examined. The complex optical constants of the polymer film are assumed to have a real component near 1.45 and an imaginary component obtained from the absorbance of the dye in the film. The imaginary index can be obtained from the Naperian absorption coefficient according to:

$$\alpha(\lambda) = \frac{4\pi n_I(\lambda)}{\lambda}. \qquad 2$$

where $\alpha$ is the absorption coefficient, $\lambda$ is wavelength and $n_I$ is the imaginary index. The absorption coefficient can also be estimated by multiplying the specific absorptivity (s, in units of L/gram-cm) by the density of the polymer ($\rho$, in grams/L) and the ratio of the mass of the dye ($m_{dye}$) to that of the polymer ($m_{polym}$) in the film preparation:

$$\alpha(\lambda) = \ln(10)\rho\left(\frac{m_{dye}}{m_{polym}}\right)s(\lambda). \qquad 3$$

Taken together, these two equations allow the imaginary index to be estimated as:

$$n_I(\lambda) = 1.21 \times 10^{-7} \lambda s(\lambda) \qquad 4$$

where $\lambda$ is the wavelength in nm. Using these parameters, the calculated absorbance (taken as 1-R) of the film on Ag at normal incidence is shown as the solid curve in FIG. 4, evaluated for a polymer film thickness of 1.02 micrometers. This thickness provided the best uniform-thickness match to the observed spectral response.

Several differences are apparent between the observed response of the modified detector (long dashes) and the best uniform thin film model of its response. The most obvious is that the dye absorbance appears sharper and stronger in the model than in the measurement. This is the result of an accidental resonance effect that suppresses the wings of the dye response and reinforces the absorbance at the maximum. Calculations with slightly thinner or thicker films show broader and weaker responses, with a maximum shifted to shorter or longer wavelengths, respectively.

A second pronounced difference is the strong interference structure observed in the blue region for the 1.02 μm thickness model. If this structure were present, the spectral resolution of our measurement in this region (10 nm) would have been adequate to capture it. We conclude the ripple structure was not present due to either scattering or variable film thickness. The surface of the detector did not appear to show significant diffuse scattering, which suggests that film roughness is a less likely explanation for the lack of observed interference effects than is non-uniformity of the film.

The detectors chosen for this illustration had a textured surface, and it is likely this texture resulted in varying thickness for the film in a more-or-less consistent manner. Tests of coatings on slides showed relatively uniform film thickness with noticeable interference effects in transmission measurements under a wide range of coating conditions, and it seems likely that the single-drip coating approach used to coat the thermopiles in this illustration would have done likewise except for this surface form factor.

Calculations performed with films of varying thickness suggest that a range of film thickness could account for the loss of most of the interference structure in the response spectrum and for the shape of the response curve in the region of the dye absorbance. When calculations were averaged for film thickness between 800 and 1200 nm, the interference effects were reduced substantially in both the blue region of the spectrum and in the region of the dye absorbance, giving rise to spectral profiles more similar to the measured spectrum than any single thickness. These effects of varying thickness were both adventitious and fortuitous, since loss of most interference structure causes the resulting responsivity curves to bear a striking resemblance to the absorption spectrum of the dye itself. If interference effects were not frustrated by phase thickness variability or surface irregularities, then achieving a reproducible modification of the detector surface would be challenging. If such detectors were fabricated commercially, imaging interferometry could be used to ascertain the consistency of coating across the full detector surface.

Figure 4:
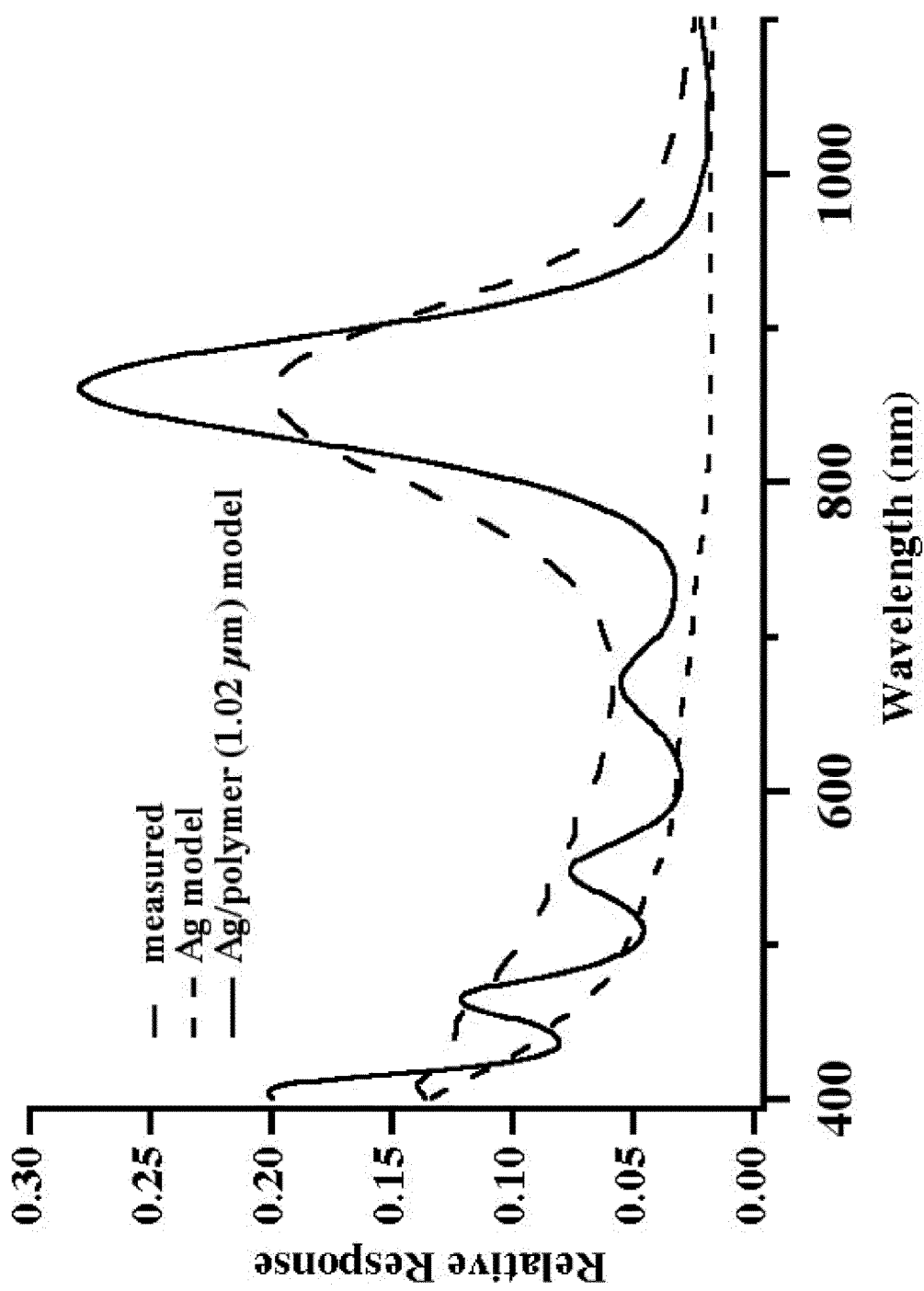
FIG. 4 illustrates the relative response of a thermopile detector.

One significant result of the thin film model is to show that thin film effects are responsible for increasing the rising blue baseline observed weakly for a pure silver surface, but which is enhanced when the Ag is coated with a polymer layer. The short dashed curve in FIG. 4 shows the result of a calculation on an uncoated Ag surface. In our measurements of coated detectors, we observed this weaker blue baseline feature in detectors modified with only Ag layers, although the particular detector response shown in FIG. 3 did not show it. After the deposition of the polymer film, the blue baseline feature was observed in all cases.

In order to illustrate reproducibility, several thermopiles were modified and calibrated over a period of 5 months. In each case, the resulting spectral profiles could always be decomposed into an exponentially decaying baseline due to absorbance in the Ag layer, plus a band due to dye absorbance. The intensity of the dye band relative to the Ag absorbance varied by approximately 20%, which was attributed to the imprecision of the manual method used to apply the polymer film. In no cases were interference fringes noted, and in no cases were the spectra resolvable into anything other than the sum of the two features just described. Results from our lab for manual deposition of these same polymer films onto glass microscope slides show approximately the same level of variability in the polymer film thickness. Automation with no other steps to control temperature and humidity improved the glass slide coating precision to better than 10% relative standard deviation.

The baseline absorbance due to Ag that forms the competing spectral profile in the results is a consequence of an absorbance of the metal. Aluminum can be used as the reflecting layer to eliminate this background feature. Regardless of the metallization used, a weak, broad absorbance will remain due to the absorbance that occurs with all metals. Additional layers could be included to increase the reflectivity of the underlying metal layer over certain ranges of wavelengths if desired. Taken together, with a combination of improved film deposition and better choice of metallization, it is likely the spectral profiles of these modified detectors can approach the reproducibility of the original thermal detectors on which they are based.

Figure 5:
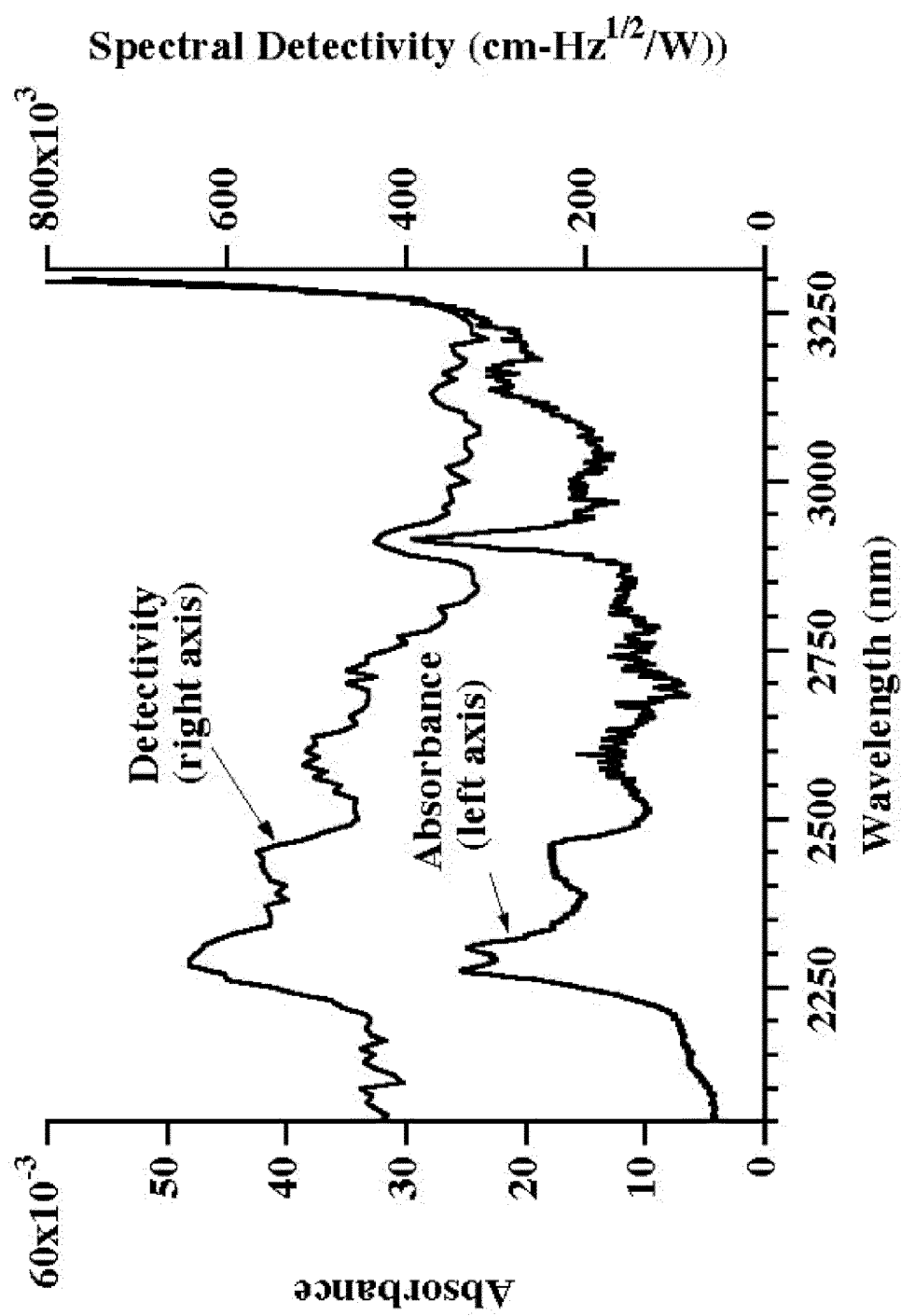
FIG. 5 illustrates detectivity of an ST150 thermopile in the long-wavelength near infrared region compared to the absorption of a thin polymer film on glass in the same spectral window.

The curves in FIG. 3 extend into the long-wave near-infrared (NIR) region in which it is possible to observe weak vibrational overtones and combination absorbance of the polymer itself. FIG. 5 shows a comparison between the measured spectral detectivity of the modified thermopile and the measured absorption spectrum of the polymer in the same region. The detector response begins to drop relative to the absorption beyond 2700 nm due to attenuation by the BK-7 window used in the detector testing apparatus. Nevertheless, all the absorption maxima found in the NIR absorption spectrum of the polymer are also found in the spectral detectivity curve of the detector.

The absorption measurement shown in FIG. 5 was made in transmission mode using a thin film deposited on a microscope slide, with both sides coated. The spectrum of this slide showed pronounced interference effects at shorter wavelengths that permit the polymer film thickness on each side of the sample to be estimated at 5.00 micrometers. This then provides a method for estimating the NIR absorption coefficients of the polymer itself and represents a second method for estimating the thickness of the film applied to the modified detectors in this illustration.

The doublet observed in the 2270-2320 nm region has a peak to valley intensity of approximately 0.015 absorbance units, providing a Naperian absorption coefficient of approximately 35/cm. In general, the absorption coefficients for these near-infrared bands vary in the range 10-50/cm. The response curve in FIG. 5 allows us to estimate the absorbance of the film on the modified detector in this region as approximately $2.7 \times 10^{-3}$, giving a pathlength estimate of 1.8 micrometers and a film thickness of 0.9 micrometers. The adjacent near-infrared absorption band between 2430-2470 nm in the absorption is consistent with a film thickness of 1.0 micrometer.

Given the uncertainties in the absolute reflectance of the black film on the as-received detector, the probability of some residual interference effects on the spectral intensities, and the inadequate resolution (40 nm) of the measurement in this window of the detector measurement, the film thickness estimate (1.02 micrometers) obtained from the thin-film modeling of the dye absorption region is not inconsistent with these somewhat lower values.

Figure 6:
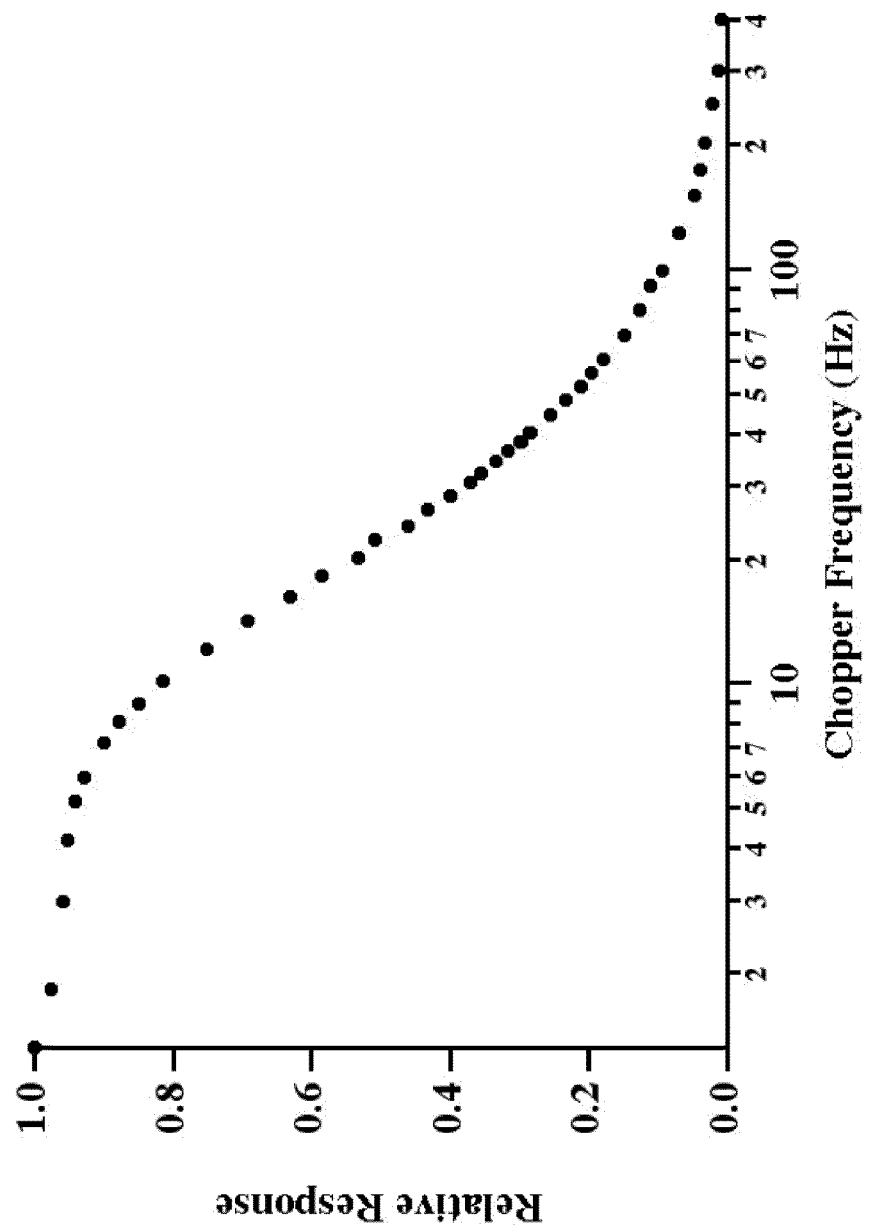
FIG. 6 illustrates the relative response of a modified ST150 thermopile as a function of chopper frequency.

FIG. 6 shows the measured relative frequency response of the modified detector as a function of modulation frequency. Thermopile detectors are generally used as DC or low-frequency AC detectors because of their relatively slow response. The time constant indicated in FIG. 6, determined as the frequency at which the response drops to about 50% of its DC value, is approximately 46 milliseconds, just above the 38 millisecond response reported by the manufacturer for the unmodified detector. The frequency response illustrated in FIG. 6 is thus characteristic of the detector alone, implying that the polymer film has a negligible impact on the result.

Absorption in the polymer film results in heating of the thermopile detector via thermal diffusion processes, and so the effective thickness of the polymer is limited by the rate at which heat can diffuse from the warmed polymer to the detector element. Since the effective thickness is rate-dependent, it is a function of the frequency at which the excitation of the detector is modulated. Equation 5 gives the dependence of the thermal diffusion pathlength, $\mu$, in meters on the chopping frequency, f, in Hz,:

$$\mu = \left(\frac{\alpha}{\pi f}\right)^{1/2}. \qquad 5$$

where $\alpha$ is the thermal diffusion coefficient in units of $m^2/sec$.

An article by A. Mandelis and M. M. Zver, J. Appl. Phys. 57, 4421 (1985), while describing a different optical configuration, provides a set of convenient quantitative definitions relevant to the performance of a system that depends at least partly on thermal diffusion through a film, which in turn are based on a previously described classification system. Specifically, the classification system is based on the relative magnitudes of the physical thickness, L, the thermal diffusion pathlength, $\mu$, and the optical pathlength, $\beta$. A film is considered thermally thin if $\mu \gg L$ and thermally thick if $\mu \ll L$. In the case of thermally thin films, the spectral response of the present system is expected to approach $(1-R)$, where R is the spectral reflectance of the device. More complex behavior is expected in the case of thermally thick films.

The definition of optical pathlength used in the above noted Applied Physics article by Mandelis and Zver is not fully appropriate to the present situation, since the reflective metal film causes the incident radiation to reflect back through the polymer film, effectively doubling the optical pathlength of the film (except for effects due to interference). This likely gives rise to another case beyond those considered there, but we can assert that optical thinness in the present case would be best defined by $\beta \gg 2L$, while the condition most consistent with the concept of an optically thick film would remain $\beta \ll L$.

In the special case of a thermally thin film, optical thickness governs the level of saturation expected in the spectral response, but in all cases the response can be estimated the spectral energy loss on reflectance. If optical interference effects are observed, they would be expected to be most pronounced in the case of optically thin films, while interference would be suppressed for optically thick films. In the intermediate case, $L<\beta<2L$, some light intensity can always reach the detector face and thus there would be a weak but fast frequency response that would grow toward saturation at lower chopping frequencies.

At the chopping frequency used in this illustration (10 Hz), the thermopile detector is near its optimal response. Thermal diffusion coefficients for three thin-film polymers (polymethyl-methacrylate, polystyrene, and polyvinylchloride) were reported to be $5 \times 10^{-8}$ m$^2$/sec. No value has been reported for Acryloid B-67, but it is likely to be in the same range as it is an alkyl methacrylate polymer. Taking this value for our polymer, the effective thermal diffusion pathlength, $\mu$, under these conditions is likely near 40 micrometers. Thermal thinness demands a film thickness of less than this value. However, as a physical thickness of 40 micrometers would correspond to an optical pathlength of 80 micrometers, modified thermopile responses can be obtained exceeding 10% of the perfect blackbody response as long as the Naperian absorption coefficient of the polymer coating exceeds about 13/cm. At such high attenuations a modified thermal detector of the type described here begins to enter a regime of optical thickness in which the spectral responsivity begins to noticeably differ from the absorption profile, becoming flattened at the wavelengths of highest absorbance. This may be perfectly acceptable for many applications.

Better frequency responses should be obtainable with materials having larger absorption coefficients. For example, the dye absorbance at 860 nm for the polymer formulation used here has a Naperian absorption coefficient of 858/cm. A film thickness of 13.4 micrometers should then permit the modified detector to achieve a response approaching 90% of the perfect absorber response at the wavelength of the maximum. At this thickness, the polymer film restricts operation to modulation frequencies below about 90 Hz to maintain the thermally thin condition. As with any other conventional black coating, the ultimate limit to the response that can be achieved is set by scattering and Fresnel reflectance losses.

Applications requiring fast responses require both a faster detector than a thermopile and a thinner film. The high frequency limit of a fast thermal detector (e.g., a pyroelectric detector) using a polymer modifier is determined by the maximum achievable absorption coefficient in the coating materials and the minimum acceptable responsivity for an application. In the UV region, absorption coefficients may exceed $10^6$/cm for pure materials, while values in the mid-infrared for strong absorbances are of the order of $10^3$/cm and those in the long-wave near-infrared are usually in the range $10^0$-$10^2$ for pure materials. Very thin films are required for a high frequency response, but very thin films (such as monolayers) on metals begin to suffer from surface selection rule problems that attenuate their spectrum for normal incidence radiation.

Simple calculations suggest that films of a strong ($\alpha=2.3 \times 10^6$/cm) UV-absorbing material at 300 nm might be expected to attenuate 90% of light for a film of only 5 nm in thickness. However, Fresnel reflectance, interference effects and surface selection rule problems limit the maximum energy loss in such a film on an optical metal to about 50% regardless of thickness, with 25% response for a film thickness of 5 nm. Still, a 5 nm film thickness should permit operation up to 600 MHz for thermal diffusion rates such as those described here. For such thin films, film uniformity and instability would represent a technical challenge. In most other spectral regions, measurements would be restricted to the sub-kHz regime and film thickness more readily achieved and controlled with polymers and molecular materials.

An optically thick film, using the criteria described above, is one in which the optical absorption pathlength is smaller than the physical thickness of the film, i.e., $\beta<L$. In this event, the thermal properties of the film govern the response. If the film is thermally thin, then we should expect that the response of the system will remain determined by the spectral energy loss on reflection of the incident light. If the film is thermally thick, however, the response should tend toward zero; since no light penetrates close enough to the thermal detector to create a significant response, similar to the results found in the Applied Physics article by Mandelis and Zver under the same conditions.

If the optical absorbance is strong at the absorption maximum of the film, but weaker on the wings of the absorption bands, it is possible for the spectral response to show a minimum at the absorption maximum and maxima on the shoulders of the absorption bands. In optically thick conditions, spectral response curves with complicated and or variable shapes could be obtained by varying the chopping frequency, providing a range of spectral responses to a single device. At frequencies of modulation near 10 Hz, a thermal detector could effectively sample heat generated throughout a polymer film with a thickness up to 40 micrometers, as described above. However, if the modulation frequency were then increased to about 100 Hz, the effective sampling thickness would fall to just above 10 micrometers. If the exterior 30 micrometers of the polymer film had great absorbance, the interior 10 micrometers might then be subject to an inner filter effect that would cause its greatest response to be on the wings of absorption bands rather than on the peaks.

Figure 7:
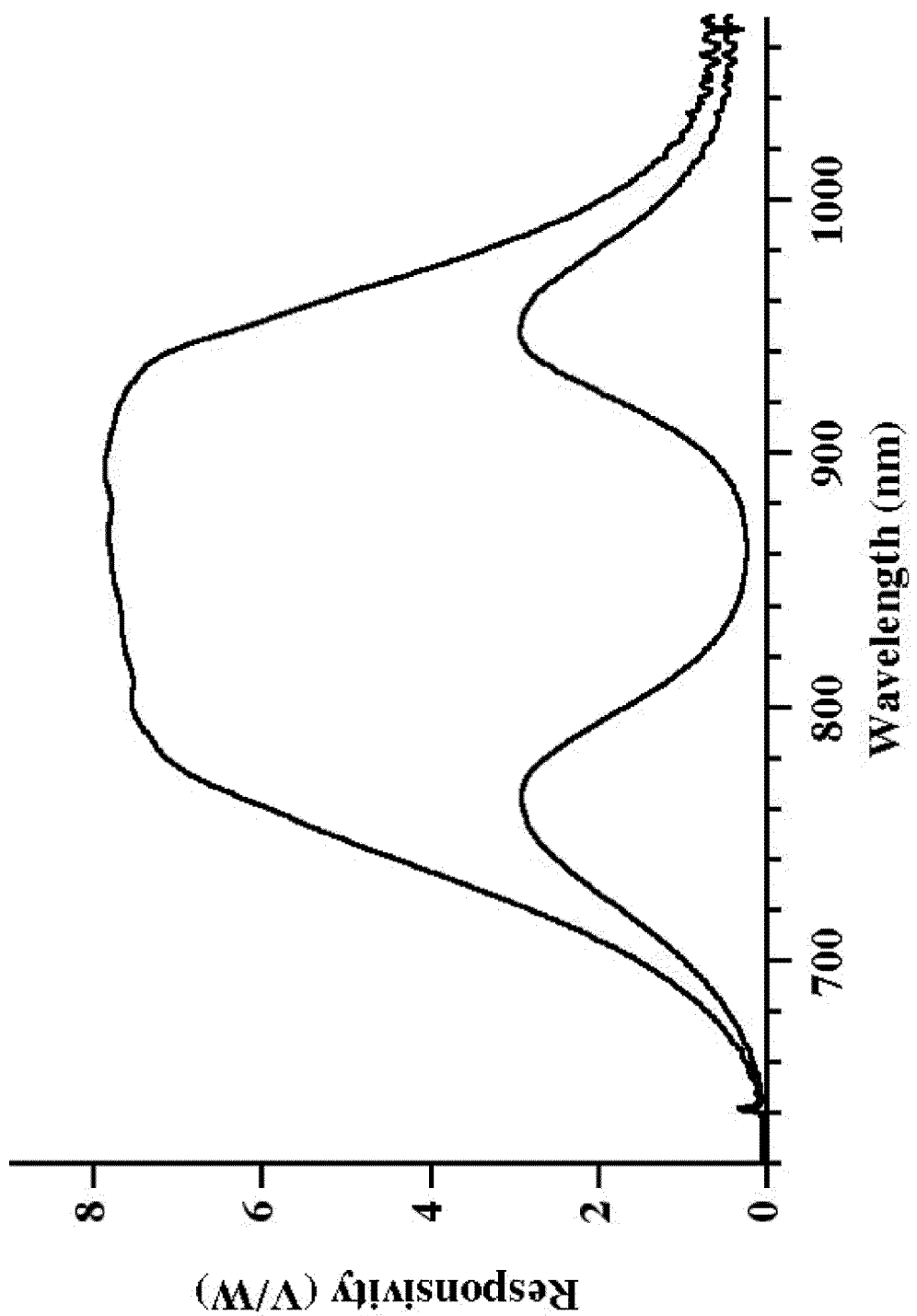
FIG. 7 illustrates chopper frequency effects on spectral response for thermally thick films.

While equations to permit an exact solution for thick films in the modified thermal detectors described here are not presently available, a simplistic model provides a sense of the effects that might be observed. FIG. 7 shows the result of a crude calculation for a doped polymer with a thickness of 15 micrometers at low and high frequency, where the high frequency is selected to respond only to the bottom ⅔ of the polymer layer thickness. The film was modeled with an absorbance profile like the dye used in these experiments, but with the coefficient increased by a factor of 3.5 compared to the film used here. The figure is drawn under the assumption of a thermally thin condition at low frequency for the entire film, while under the high frequency condition all heat generated in the bottom ⅔ of the film is detected, while no heat from the top ⅓ is detected.

This approach could conceivably be used to control or filter the response of a detector to be even more sensitive to the response of an analyte in a mixture as follows. First, a polymer or film containing the absorbance of the analyte would be deposited onto the thermal detector surface. Afterwards, following the possible addition of a spacer and separator layer, a polymer or film containing absorbance associated with chemical interferences could be added. This additional coating could be used to reduce the intensities of light wavelengths primarily absorbed by interferences, with a high frequency of modulation being used to prevent this absorbance from being sampled.

However, unless physical space were at a premium in a device, a more facile use of this latter principle would be obtained by adding a separate transparent plate with the interferent polymer as a prefilter before the modified thermal detector. This has the advantage of separating the steps in production to improve efficiency.

A method for producing thermal detectors with spectral responsivities that mimic the absorptions of chemical analytes, and whose detector characteristics approach those of conventional broad-band thermal detectors, has been described herein. The basis of the detector modification is the addition of an absorbing film above a reflector deposited directly on a thermal detector element. We employed a thermopile-type detector in the illustration, but the method is general to all types of thermal detectors that can be divided into separate absorber and thermal sensor components.

We find that generally such detectors are subject to interference effects that can mask the properties of an absorbing film unless film thickness variations or surface roughness negate them. If interference effects are significant, the shape of the spectral responsivity curve of the detector becomes very sensitive to the thickness of the film, and is thus probably difficult to control or predict. If these effects are minimized by one or more methods, then the overall spectral detectivity, $D^*$, for the modified detector can approach the product of the inherent $D^*$ of the detector with the absorbance of the film, where the absorbance is the fraction of light absorbed, as shown in Equation 6:

$$D^*_{MOD}(\lambda,f) \approx (1-e^{-2\alpha d})D^*(\lambda,f) \qquad 6$$

where $\alpha$ is the Naperian absorption coefficient and d is the film thickness. This equation holds true whenever the film thickness is less than the thermal diffusion pathlength.

Because of physical constraints on the absorption coefficients of pure materials, the response speed of detectors using chemical modifiers will usually be limited to <1 kHz, although UV-Vis-type detectors might respond more quickly.

Finally, the dependence of the thermal diffusion length on light modulation frequency indicates a wide variety of "tricks" one can play by modulating frequency. Among these tricks are: changing the spectral responsivity of the detector by changing modulating frequencies; asserting or overcoming inner filter effects by frequency selection; and producing response multilayers in which only the closest films to the detector element give rise to the measured thermal response.

At room temperature, thermal detectors are relatively low in detectivity compared to photon detectors. Thus the method described here has applications where light is strong enough to give the requisite signal to noise to enable a measurement.

Although the present subject matter has been described in such a way as to provide an enabling disclosure for one skilled in the art to make and use the invention, it should be understood that the descriptive illustration of the invention is not intended to limit the present invention to use only as shown in the figures. Thus, while exemplary embodiments of the invention have been described, those of ordinary skill in the art will recognize that changes and modifications may be made without departing from the scope and spirit of the present subject matter.

What is claimed is:

1. A method for adjusting the spectral detectivity of a detector, comprising: providing a detector having a broadband sensitive portion; coating the broadband sensitive portion with a first material to reduce the interaction of the detector with light; and coating the first material with a second material having spectral absorption characteristics, wherein the broadband sensitive portion is coupled to receive an energy from the second material.

2. The method of claim 1, wherein the first material is a mirror coating material.

3. The method of claim 1, wherein the mirror coating is a metal.

4. The method of claim 3, wherein the metal is silver.

5. The method of claim 1, wherein the second material is a polymer.

6. The method of claim 5, wherein the polymer comprises a near infrared dye.

7. The method of claim 6, wherein the dye absorbs light in a spectral band within the 700 nm to 1000 nm spectral region.

8. The method of claim 6, wherein the dye is mixed with a binding material that is transparent between 400 nm and 1100 nm.

9. The method of claim 1, wherein providing a detector comprises providing a thermal detector.

10. The method of claim 1, wherein providing a detector comprises providing a thermopile detector.

11. The method of claim 10, wherein providing a thermopile detector comprises providing a Si-based thermopile detector.

12. The method of claim 1, further comprising: providing an electrically insulating coating on the broadband sensitive portion of the detector prior to coating the broadband sensitive portion with said first material.

13. The method of claim 12, wherein the electrically insulating material is a $SiO_2$ film.

14. The method of claim 1 wherein the energy is a thermal energy.

15. The method of claim 1 wherein the broadband sensitive portion comprises a photoacoustic medium.

16. A detector, comprising: a broadband sensitive detector material; a layer of light reflecting material disposed on at least a portion of the broadband sensitive detector material to reduce the interaction of the detector with light; and a layer of spectral absorption material disposed on said light reflecting material, wherein the broadband sensitive detector material is coupled to receive an energy from the spectral absorption material.

17. A detector as in claim 16, further comprising: a layer of insulating material between said light sensitive material and said light reflecting material.

18. A detector as in claim 16, wherein the light reflecting material is a metal.

19. A detector as in claim 18, wherein the metal is silver.

20. A detector as in claim 16, wherein the spectral absorption material is a near-infrared dye.

21. A detector as in claim 20, wherein the dye is mixed with a binding material that is transparent in a spectral region included within the visible, the MIR, and the NIR spectral regions.

22. The detector as in claim 21 wherein the spectral region comprises wavelengths from 400 nm to 1100 nm.

23. A detector as in claim 16, wherein the broadband sensitive detector is Si-based thermopile detector.

24. A detector having spectral responsivity similar to chemical analytes, comprising:
   a detector including a broadband sensitive portion;
   a layer of a first material disposed on the detector to reduce the interaction of the broadband sensitive portion with light; and
   an absorbing layer of a second material disposed on the layer of a first material; wherein
   incoming light impinges first on the absorbing layer of a second material and the broadband sensitive portion is coupled to receive an energy from the second material.

25. The detector of claim 24 wherein the energy is a thermal energy.

26. The detector of claim 24 wherein the broadband sensitive portion comprises a photoacoustic medium.

27. The detector of claim 24 wherein the absorbing layer of material has a thickness to reduce an optical interference.

28. The detector of claim 24 wherein the second material has an absorption profile correlated to an absorption profile of a chemical analyte of interest.

29. The detector of claim 28 wherein the chemical analyte is a chemical factor in a multivariate optical computing system.

30. The detector of claim 24 wherein the absorbing layer has a thickness less than a thermal diffusion path length of the second material.

31. A method for using an optical detector comprising:
   modulating light at a frequency; and
   directing the modulated light to the optical detector, wherein the optical detector comprises:
      a detector including a broadband sensitive portion;
      a layer of a first material formed on the broadband sensitive portion to reduce the interaction of the detector with light; and
      an absorbing layer of a second material formed on the layer of a first material; wherein
      the modulated light impinges first on the absorbing layer of the second material and the broadband sensitive portion is coupled to receive an energy from the second material.

32. The method of claim 31 wherein the frequency is selected according to a thermal conductivity of the second material.

33. The method of claim 32 wherein the frequency is selected according to a thickness of the absorbing layer of the second material.

34. The method of claim 32 wherein modulating light at a frequency comprises:
   modifying the frequency of the modulation to change a spectral responsivity of the optical detector.

35. The method of claim 34 wherein modifying the frequency of the modulation comprises:
   increasing the frequency of the modulation to increase the spectral responsivity in the wings of absorption bands of the second material.

36. A method for adjusting the spectral detectivity of a detector, comprising:
   coating a broadband sensitive portion of the detector with a first material to reduce the response of the detector to light;
   coating the first material with a second material that has spectral absorption characteristics; and
   adding a polymer to the second material, whereby the spectral absorbance of the second material combined with the spectral absorbance of the polymer determines the sensitivity of the detector; and whereby the broadband sensitive portion is coupled to receive an energy from the second material.

* * * * *